United States Patent
Lama

(10) Patent No.: US 8,525,365 B2
(45) Date of Patent: Sep. 3, 2013

(54) DEVICE FOR GENERATING ELECTRIC ENERGY FROM A RENEWABLE SOURCE

(75) Inventor: Arturo Lama, Brescia (IT)

(73) Assignee: Tecnomac S.r.l., Flero, Brescia (IT)

( * ) Notice: Subject to any disclaimer, the term of this patent is extended or adjusted under 35 U.S.C. 154(b) by 205 days.

(21) Appl. No.: 13/124,169

(22) PCT Filed: Aug. 7, 2009

(86) PCT No.: PCT/IB2009/053490
§ 371 (c)(1), (2), (4) Date: Apr. 14, 2011

(87) PCT Pub. No.: WO2010/043987
PCT Pub. Date: Apr. 22, 2010

(65) Prior Publication Data
US 2011/0198851 A1    Aug. 18, 2011

(30) Foreign Application Priority Data
Oct. 14, 2008 (IT) .............................. BS2008A0180

(51) Int. Cl.
*F03B 13/00* (2006.01)
*H02P 9/04* (2006.01)
*F03B 13/10* (2006.01)

(52) U.S. Cl.
USPC ............................................. 290/54; 290/53

(58) Field of Classification Search
USPC ................... 290/42, 43, 53, 54; 60/495, 496, 60/498, 501, 502, 505; 415/3.1
See application file for complete search history.

(56) References Cited

U.S. PATENT DOCUMENTS

| | | |
|---|---|---|
| 1,688,032 A | 10/1928 | Blair |
| 1,887,316 A | 11/1932 | Lockfaw |
| 3,828,557 A | 8/1974 | Mochel |
| 4,258,270 A * | 3/1981 | Tornkvist .................. 290/53 |
| 4,560,884 A * | 12/1985 | Whittecar .................. 290/42 |
| 5,094,595 A | 3/1992 | Labrador |
| 6,234,062 B1 * | 5/2001 | Griffin ....................... 92/23 |
| 2004/0046396 A1 * | 3/2004 | Molina et al. .............. 290/53 |
| 2006/0156846 A1 * | 7/2006 | Neubauer et al. .......... 74/425 |
| 2006/0214982 A1 * | 9/2006 | Yamamoto et al. ........ 347/30 |
| 2008/0202092 A1 * | 8/2008 | Eluripati et al. .......... 60/39.83 |

FOREIGN PATENT DOCUMENTS

| | | |
|---|---|---|
| FR | 2346571 | 10/1977 |
| GB | 2026621 | 2/1980 |
| GB | 2071772 | 9/1981 |
| WO | 02/090768 | 11/2002 |
| WO | 03/036081 | 5/2003 |
| WO | 2004/007953 | 1/2004 |
| WO | 2007/125156 | 11/2007 |

* cited by examiner

*Primary Examiner* — Julio Gonzalez
*Assistant Examiner* — Thomas Quigley
(74) *Attorney, Agent, or Firm* — Shoemaker and Mattare

(57) ABSTRACT

A device for generating electric energy (1) from a renewable source, in particular from wave energy, comprising an oscillating device (2) that can transform the thrust of a natural agent on the first extremity of oscillating device (2) into kinetic energy; a motor unit, operatively connected to a second extremity of the oscillating device in such a way as to receive the kinetic energy transmitted by the oscillating device (2); and an electrical rotating machine operatively connected to the motor unit and suitable for producing electricity when it is set to rotating by the said motor unit.

21 Claims, 9 Drawing Sheets

DEVICE FOR GENERATING ELECTRIC ENERGY FROM A RENEWABLE SOURCE

This invention concerns a device for generating electric energy from a renewable source, in particular suitable for generating energy by exploiting the action of external agents, for example wave energy.

Devices suitable for these applications are characterised mainly by the fact that they guarantee users the possibility of exploiting renewable sources such as wave energy, without the need for mains electricity supply or having to depend on fuels not available in all situations and places, such as petrol, diesel or gas.

The widespread devices for this type of use exploit wave energy in different ways, all with view to starting up a generator for the production of energy.

Some of them are floating tubular structures anchored to the seabed. With the motion of the waves water enters and leaves these structures, activating special turbines.

Other devices are built on coastlines and consist of reinforced concrete structures with a special turbine installed in them.

In these devices the waves penetrate the reinforced concrete structures and compress the air inside which in turn activates the turbine.

However there are disadvantages in installing these devices.

Firstly, the types of devices envisaged for the open sea involve difficult installation and maintenance operations which are not always possible due to weather conditions.

The turbines associated with both offshore and coastal devices must be made of material with, respectively, high and medium levels of resistance to marine corrosion, with a consequent increase in costs.

Coastal devices moreover call for enormous reinforced concrete structures of questionable environmental impact.

Disadvantageously, these devices are of considerable bulk.

Disadvantageously, lastly, these devices are of limited yield and cannot adapt to different wave conditions.

The aim of this invention is to overcome the disadvantages prevailing in the state of the art.

This aim is achieved by an energy generating device according to claim 1. The dependent claims describe preferred embodiments.

Further features and advantages of the invention will be clear from the following description, given by way of example and not limitative, according to the attached drawings, wherein:

FIG. 8 is a transversal section of the pressure multiplier cylinder.

Figure 9:
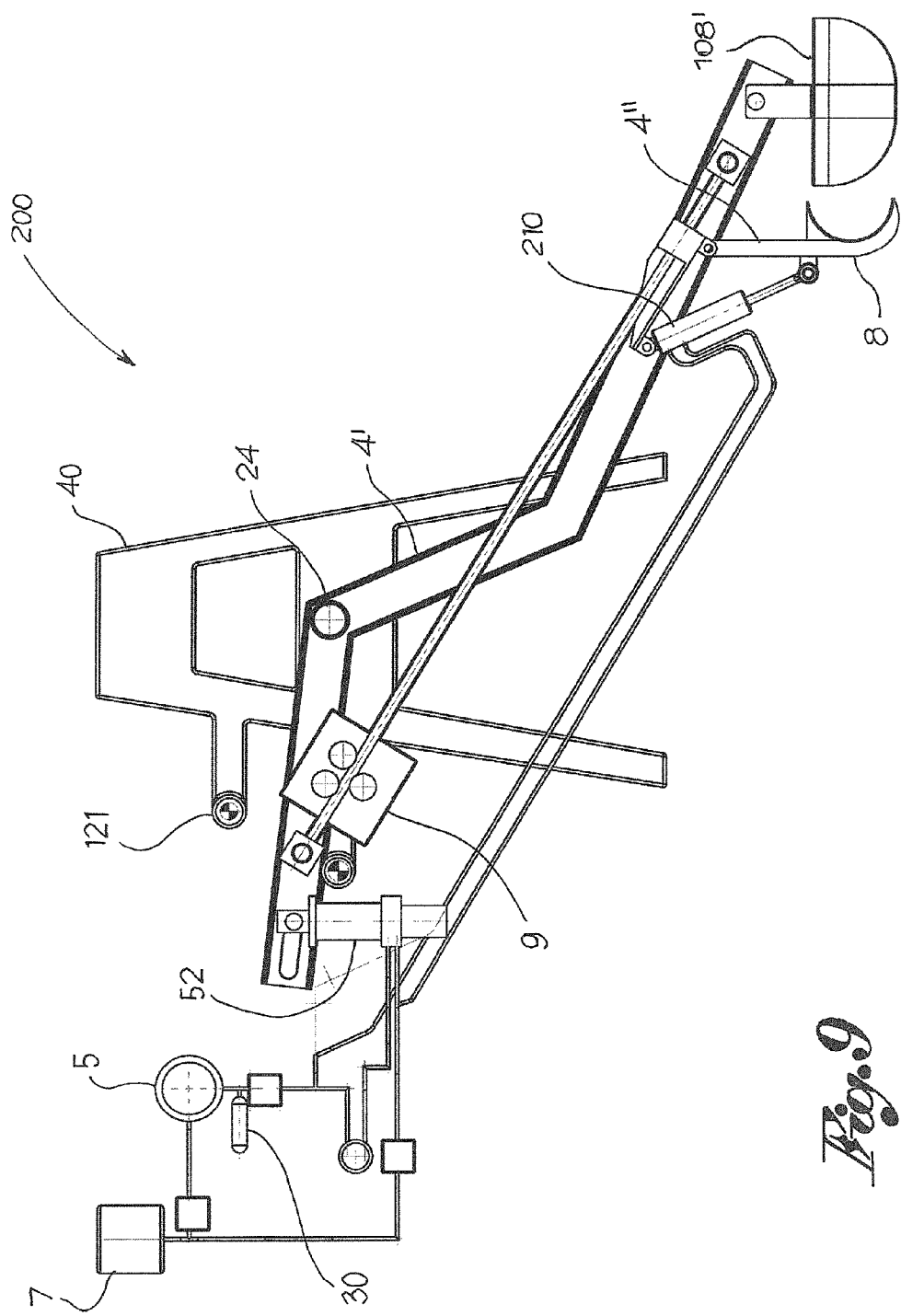
FIG. 9 shows the device in a further preferred embodiment, in a side view.
Figure 10:
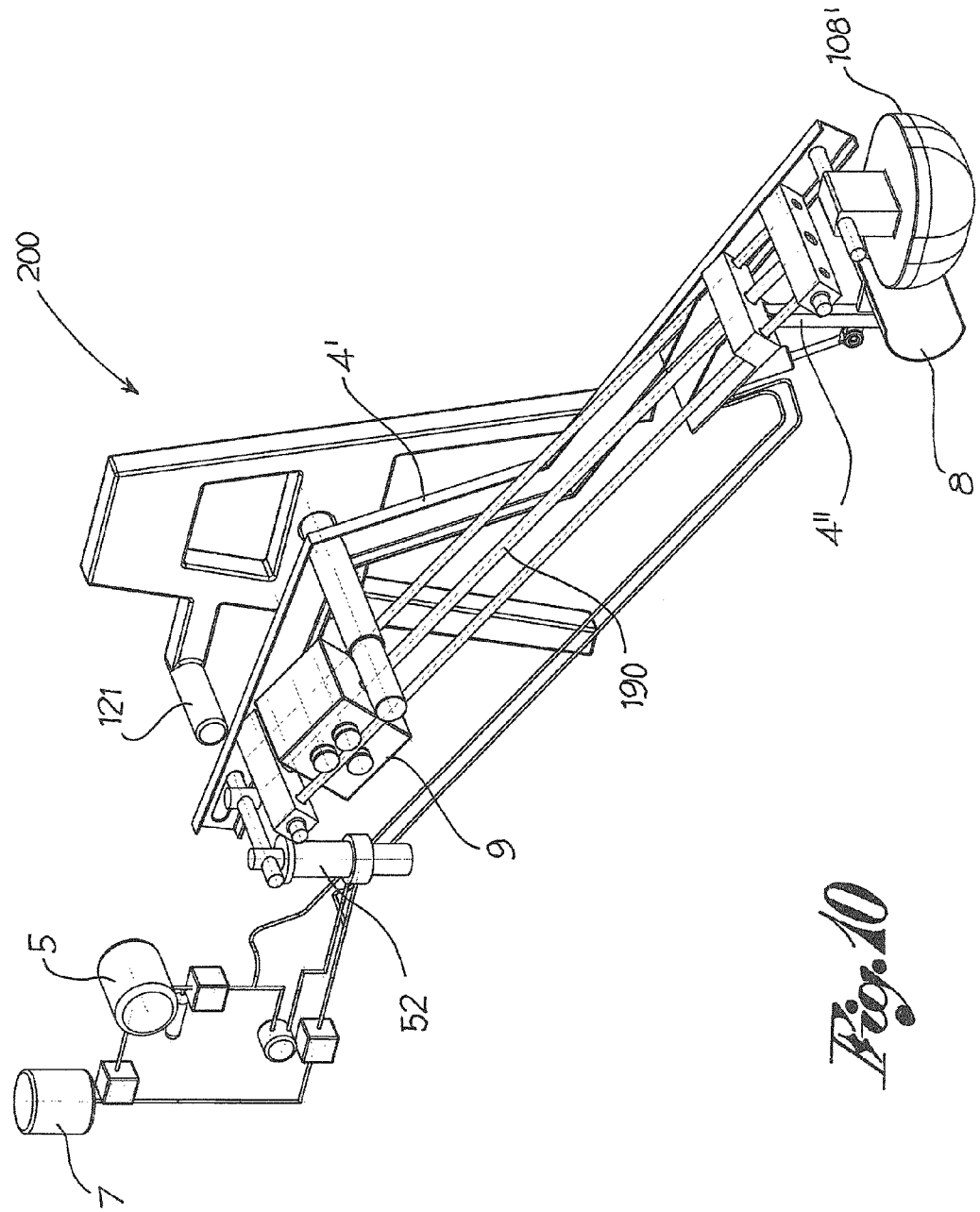
FIG. 10 shows the device in FIG. 9, in a perspective view.
Figure 11:
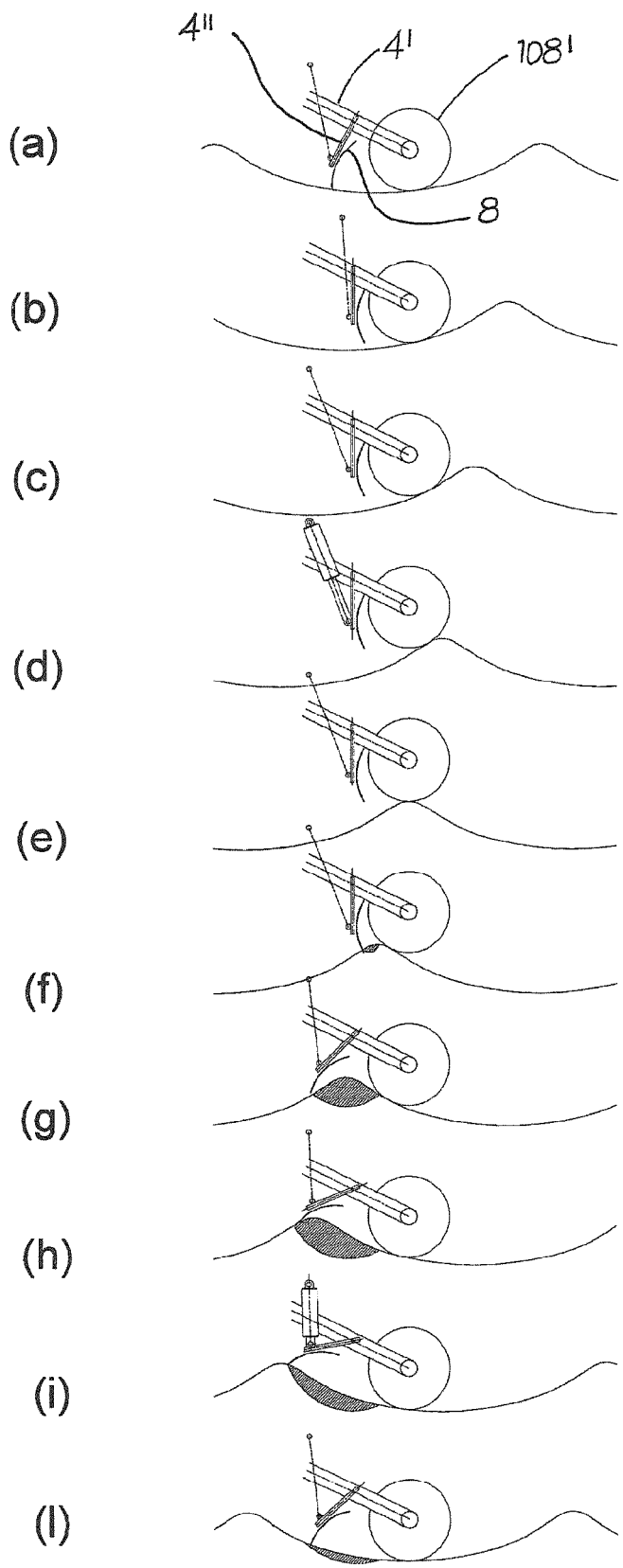

FIG. 11 schematically shows the interaction between the oscillating parts of the device in FIGS. 9 and 10 and the sea waves.

With reference to the above figures, the reference number 1 globally indicates a device for wave energy transfer.

According to a general embodiment, the device 1 comprises an oscillating device 2 with an extremity suitably profiled to receive the thrust of an external agent, such as a wave, and an opposite extremity which cooperates with a motor unit which is in turn connected to an electric machine.

In other words, the oscillating device is a lever that can transform the energy produced by the thrust of the external agent into kinetic energy suitable for advantageously moving the liquid that supplies a motor unit.

Rotation of said motor unit is then converted into electricity by the associated electric machine.

According to one advantageous embodiment, oscillating device 2 comprises a thrust lever 4, fixed to a support frame 40 (illustrated in FIGS. 4 and 5) by rotation pin 24.

The oscillating device 2 moreover comprises a scoop 8, mounted at an extremity of thrust lever 4 and suitable for receiving the thrust of an external agent, and a return element 9 suitable for bringing the oscillating device back to the start stroke position.

The maximum travel of oscillating device 2 is limited by start stroke arrest 20 and end stroke arrest 21, connected to support frame 40.

The scoop 8 is formed in a substantially concave way with view to efficiently capturing the energy deriving from wave action.

In one embodiment, the oscillating device 2 is positioned in such a way that in the start stroke working position the concave part of scoop 8 is substantially positioned towards the direction of progress of the waves. In this case the oscillating device 2 can capture the action of the wave even when the waves are not very high.

In one further embodiment, the oscillating device 2 is oriented substantially in a horizontal direction in such a way that in the start stroke working position the concave part of scoop 8 is substantially parallel to the direction of progress of the waves. In this embodiment, advantageously, the scoop 8 is replaced by a float (FIG. 4) in such a way that the oscillating device 2 can function without the use of a return element inasmuch as it can follow the progress of the wave.

In one embodiment, the position of rotation pin 24 on the axis of thrust lever 4 is variable depending on the wave force acting on oscillating device 2.

In other words, depending on sea conditions, by shifting the rotation pin the leverage ratio of oscillating device 2 is varied, with consequent variation of force intensity and therefore of the energy transmitted to the motor unit.

Advantageously, oscillating device 2 can vary in configuration depending on operative conditions, this with view to ensuring a constant yield and to avoiding structural damage in adverse operative conditions.

The return element 9 facilitates return of thrust lever 4 to start stroke position and is mounted on thrust lever 4 in a position opposite to the compression means 6.

In an advantageous variant, return element 9 is a counterweight.

In one embodiment, counterweight 9 is mounted on thrust lever 4 in an overhanging manner, at a distance from the axis of thrust lever 4 that varies according to operative conditions.

In other words, on variation of sea conditions and/or variation of the leverage ratio of oscillating device 2 and/or variation of the width and therefore dimensions of scoop 8, with view to rendering more efficient the return of thrust means 2 to the start stroke position, the return element 9 is mounted with a greater or lesser overhang according to the specific case.

In one embodiment, the return element 9 is an elastic element such as a spring.

Advantageously, the rigidity of the elastic element is variable according to operative conditions, with view to improving efficiency of the return of thrust means 2 to the start stroke position.

In one favoured embodiment, oscillating device 2 comprises a compression means 6, mounted in a position opposite to scoop 8 and with a thrust surface 10, substantially convex.

Said thrust surface 10 is the surface which, under operational conditions, engages the motor unit to transmit the kinetic energy generated by wave movement.

According to one favoured embodiment, the motor unit comprises a containment lung 3, suitable for containing a fluid, for example air, or preferably a liquid, for example mineral oil, a turbine 5, operationally hooked up to an electrical rotating machine and set in motion by the fluid under pressure from containment lung 3, and a recovery tank 7 for recovering the fluid that passes through turbine 5 and for re-injecting it into lung 3.

Containment lung 3 has an inlet 13 facing oscillating device 2, and an outlet 14 facing turbine 5.

According to an advantageous embodiment, containment lung 3 is funnel shaped with the inlet section 13 greater than the outlet 14. The extent of this difference determines the capacity of lung 3 to accelerate the fluid contained therein between inlet 13 and outlet 14.

In other words, the greater difference there is between the sections of inlet 13 and outlet 14, the greater the thrust given by lung 3 to the fluid it contains.

In yet other words, containment lung 3 functions as a pressure multiplier.

According to one embodiment, containment lung 3 comprises a bellows cylinder.

In any case containment lung 3 is fixed to the support frame in such a way that its inlet 13 is substantially opposite compression means 6 of thrust means 2.

According to one embodiment, and especially in the case of the funnel conformation, in correspondence to inlet 13 the containment lung 3 is delimited by a yielding element 15, for example a membrane.

Preferably the said yielding element 15 is engaged with inlet 13 in such a way as to ensure a seal and avoid leaks of fluid through the said inlet 13.

Outlet 14 of containment lung 3 is in fluidic connection with turbine 5.

According to one embodiment, at the exit of outlet of containment lung 3 there is at least one valve system 22.

In one favoured embodiment the said valve system 22 is a unidirectional or non-return valve.

The containment lung 3 also comprises a lateral area 16, for example of a substantially truncated-cone shape in the case of funnel conformation, between inlet 13 and outlet 14.

The said lateral area 16 comprises an aperture 17 by means of which containment lung 3 is in fluidic connection with recovery tank 7 and in which there is at least one valve system 23.

In one favoured embodiment the said valve system 23 is a runner valve.

In one further embodiment the said valve system 23 allows the said unidirectional passage of fluid only in the presence, preferably in containment lung 3, of suitable operative conditions, for example in terms of pressure.

In other words, in one advantageous embodiment, the opening of valve system 23 takes place only when, in containment lung 3, pressures are reached which substantially approximate to those recorded in appropriate functioning conditions, for example in conditions of start stroke of the device.

In yet other words, when pressure in containment lung 3 begins to increase, valve system 3 is in the closed position and does not allow fluid to pass; when the pressure diminishes, valve system 3 is in the open position and allows fluid to pass into containment lung 3.

Containment lung 3 is in fluidic connection with turbine 5 by means of turbine inlet conduit 18.

Turbine 5 is operatively connected with an electrical rotating machine, for example a dynamo or alternator, to which it transmits motion for the production of energy.

Turbine 5 is also in fluidic connection with recovery tank 7 by means of turbine outlet conduit 19.

Recovery tank 7 is in fluidic connection with containment lung 3 by means of aperture 17.

Recovery tank 7 is a tank in which the fluid from turbine 5 is recovered in order to be returned to containment lung 3, thus permitting a new refilling.

Figure 1:
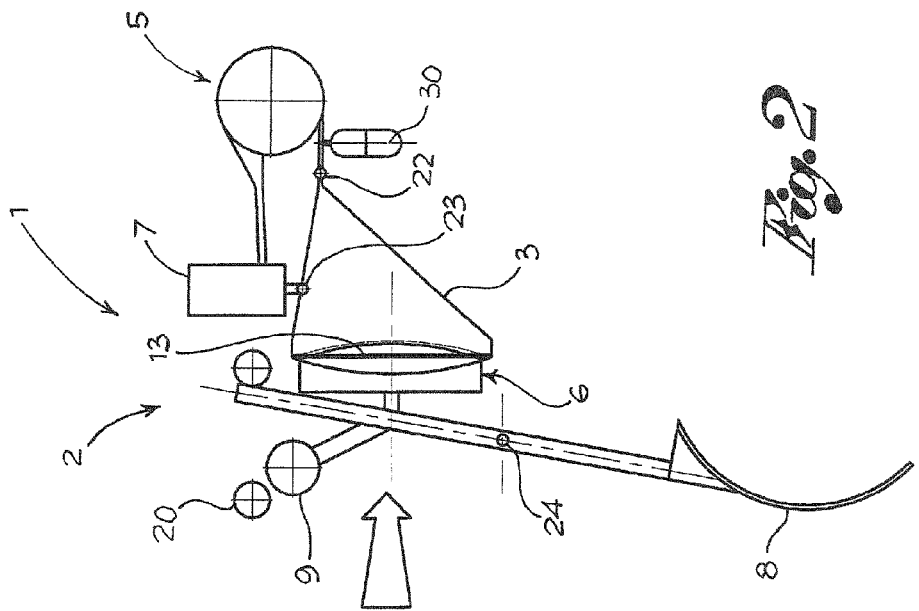
FIG. 1 shows the device according to the invention in a start stroke working position.
Figure 2:
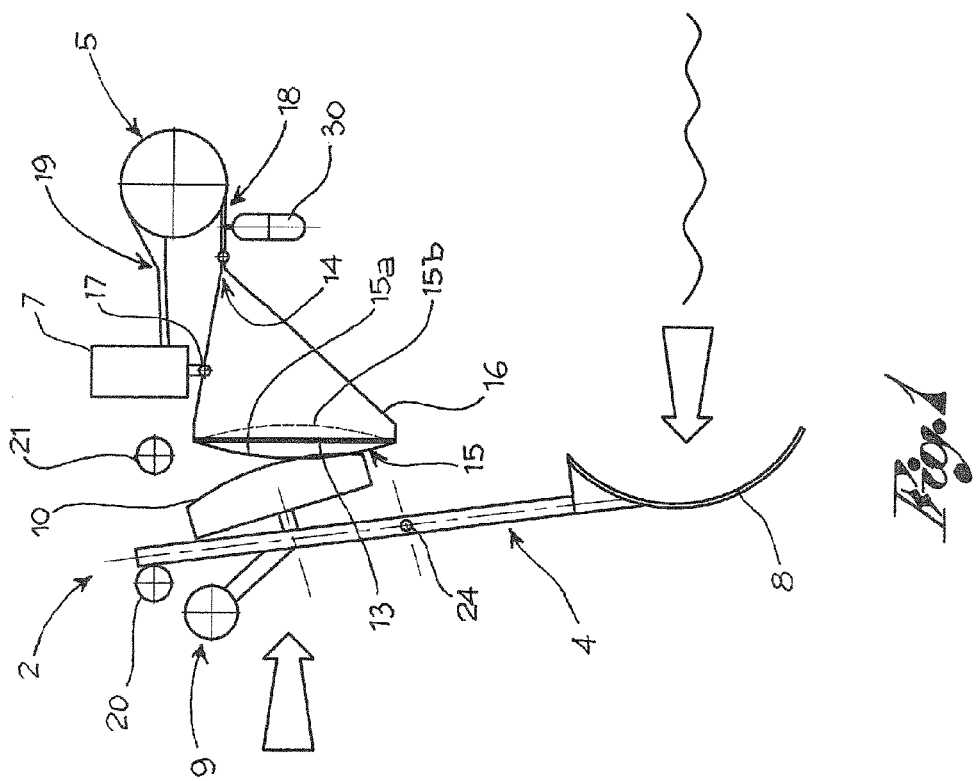
FIG. 2 shows the device according to the invention in an end stroke working position.

With reference to FIGS. 1 and 2, the functioning method of this invented device is illustrated below.

Considering the device at the start stroke working position, initially an external agent, for example a wave, exerts a thrust on the concave part of scoop 8 of oscillating device 2.

Due to the thrust exerted on scoop 8, the oscillating device 2 rotates and transmits captured kinetic energy to compression means 6.

Thrust surface 10 of compression means 6 exerts pressure on membrane 15 of containment lung 3, deforming it and preferably taking it from start stroke configuration 15*a* to end stroke configuration 15*b*.

The gradual deformation of membrane 15, from position 15*a* to position 15*b*, induces a gradual increase of pressure in the fluid in containment lung 3.

The said increase of pressure causes closure of valve system 23, forcing the fluid through outlet 14.

The fluid, having passed through outlet 14, passes through unidirectional valve 22 and, by way of a turbine inlet conduit, is conveyed to the blades of turbine 5.

The fluid then acts on the blades of turbine 5, making them rotate.

The said blades, rotating, start up the electrical machine, operatively connected to the turbine, which thus produces electricity.

Preferably the fluid, having complete its function of thrust on the turbine blades, leaves the turbine and is conveyed to recovery tank 7 by way of the turbine outlet conduit 19.

When the wave thrust is over, the oscillating device 2, with the aid of return element 9, returns towards the start stroke position until it contacts start stroke arrest 20.

During the return stroke of oscillating device 2, in other words when the thrust is over, the pressure in containment lung 3 decreases, returning to values substantially close to those recorded in the start stroke condition.

The said diminution of pressure causes opening of valve system 23 with subsequent outflow of fluid from recovery tank 7 to containment lung 3, permitting a refilling thereof.

The device, having returned to the start stroke configuration, is activated by another wave and repeats the cycle.

According to an advantageous variation of embodiment, the motor unit described above comprises an expansion tank 30, operatively connected with the turbine and positioned, for example, between outlet 14 and the said turbine 5, but in any case after non return valve 22.

The said expansion tank 30 collects a part of the fluid compressed during the initial phase of functioning, which is to say during the phase in which the oscillating device compresses the fluid in the containment lung and then releases it during the subsequent phase of decompression, i.e. during the phase in which the oscillating device, with thrust exhausted, tends to return to the initial configuration.

The said released fluid is conveyed to the turbine and has an energy such as to permit its motion.

Advantageously, the expansion tank ensures continual functioning of the turbine and therefore of the electrical rotating machine.

It should be underscored that use of the containment lung results in obtaining a multiplication of the pressure of the fluid which supplies the turbine, and therefore the transfer of a considerable quantity of energy without the use of mechanical parts which would create problems of wear and in any case involve heavy weights, bulk and high costs, including installation and maintenance.

According to one further embodiment, the motor unit, instead of being started through compression of a fluid, draws its motion from oscillating device 2 by means of a mechanical gear, for example a rack which in turn engages a toothed wheel, for example a pinion, connected to the electrical rotating machine.

At each complete stroke of oscillating device 2, i.e. from start stroke to subsequent return, the rack associated with the said oscillating device moves with rectilinear alternated motion followed by alternated rotation of the pinion which in turn starts up the electrical rotating machine.

Advantageously, the electrical rotating machine in this case comprises an alternator.

Also advantageously, the motor unit comprising rack and pinion ensures continual functioning of the electrical rotating machine. In other words, the electrical rotating machine is set in rotation at every travel of oscillating device 2, so it doesn't undergo periods of inactivity such as for example during the return phase of oscillating device 2 to the start stroke condition.

Figure 3:
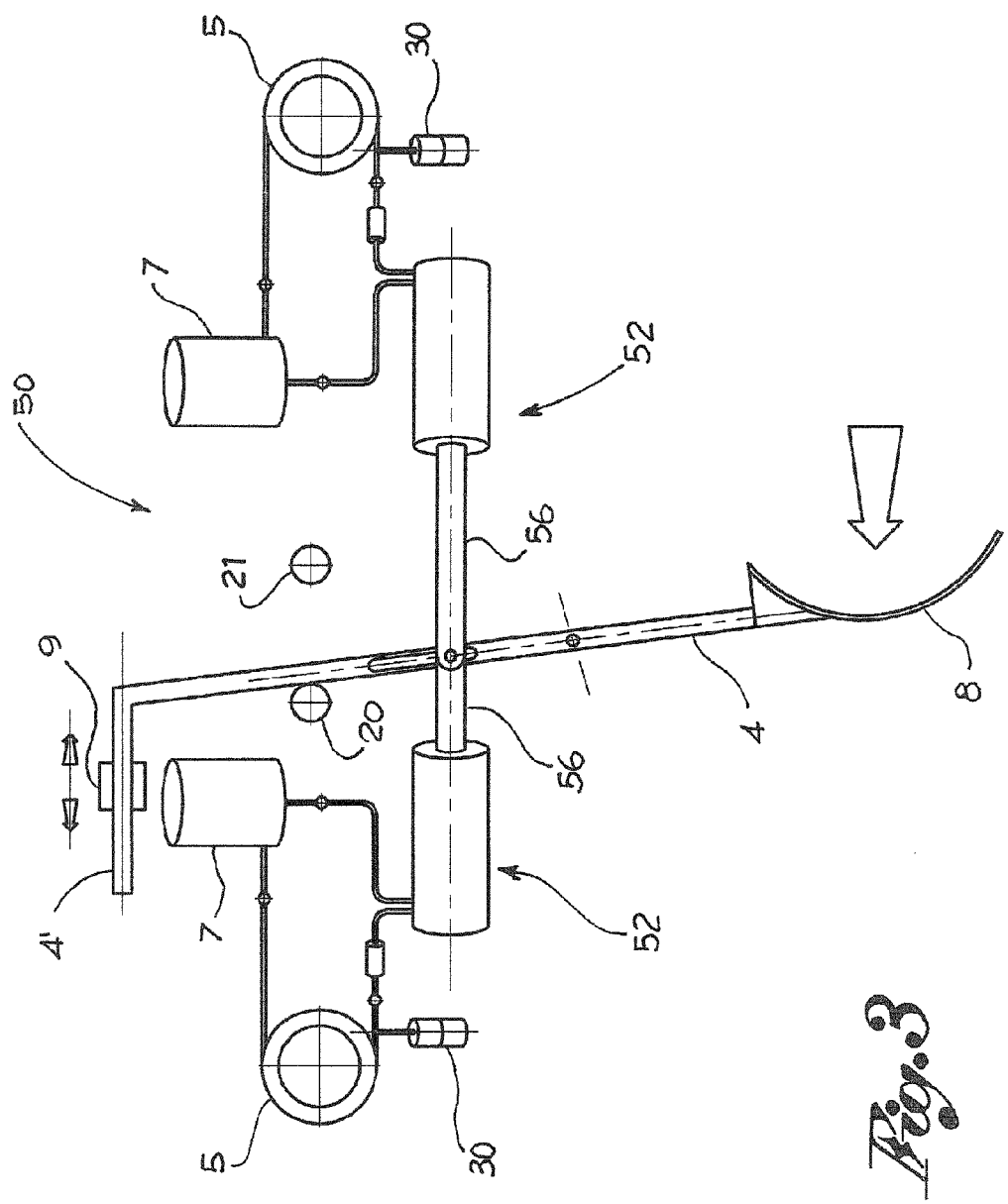
FIG. 3 illustrates the device in a preferred embodiment.

FIG. 3 illustrates a device 50 according to the invention, in one preferred embodiment. In this figure the parts common to previously described embodiments are indicated with the same numerical references.

Figure 6:
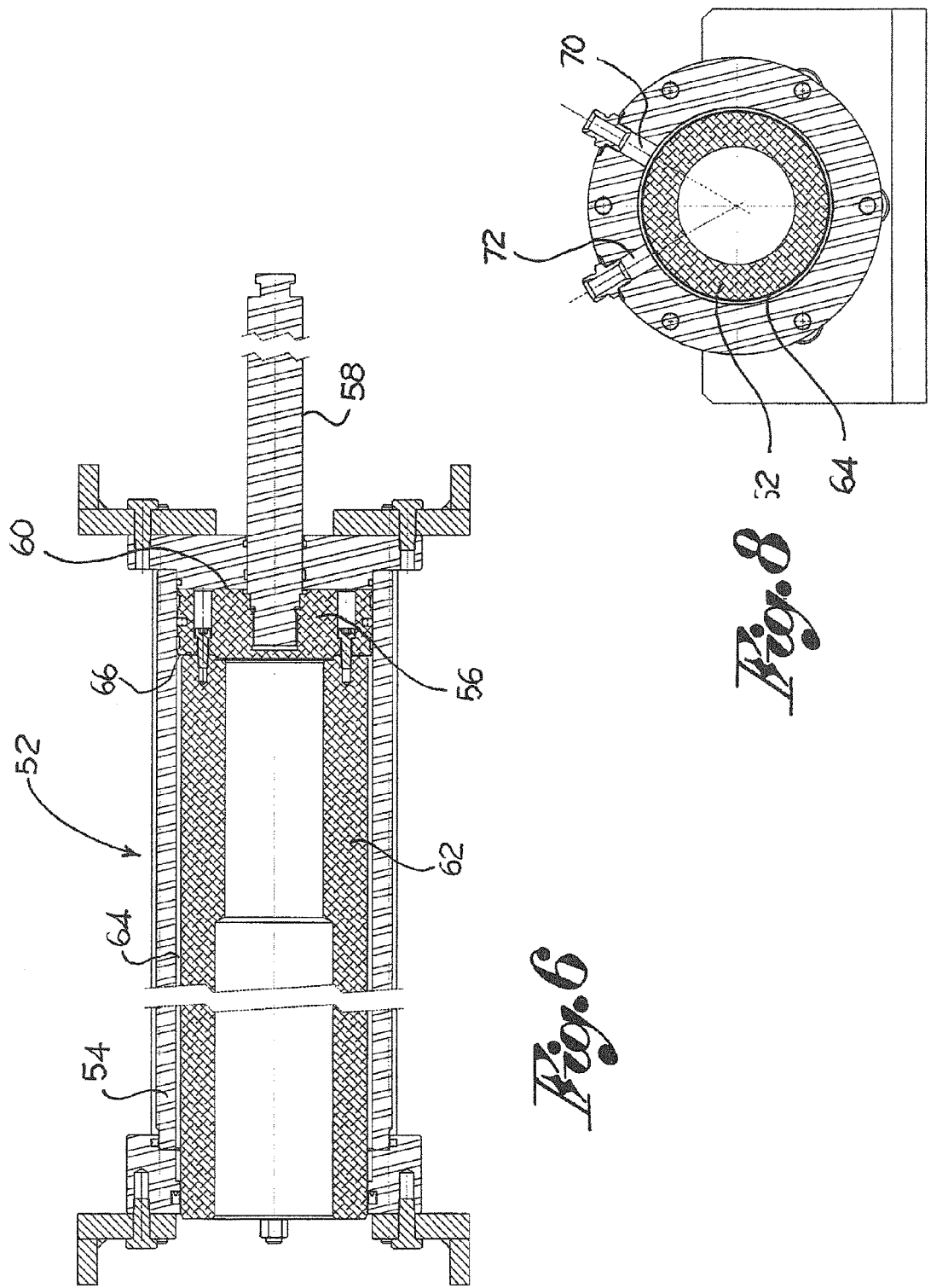
FIG. 6 is an axial section of a pressure multiplier cylinder with the piston at end of stroke in the configuration of intake of the working liquid.
Figure 7:
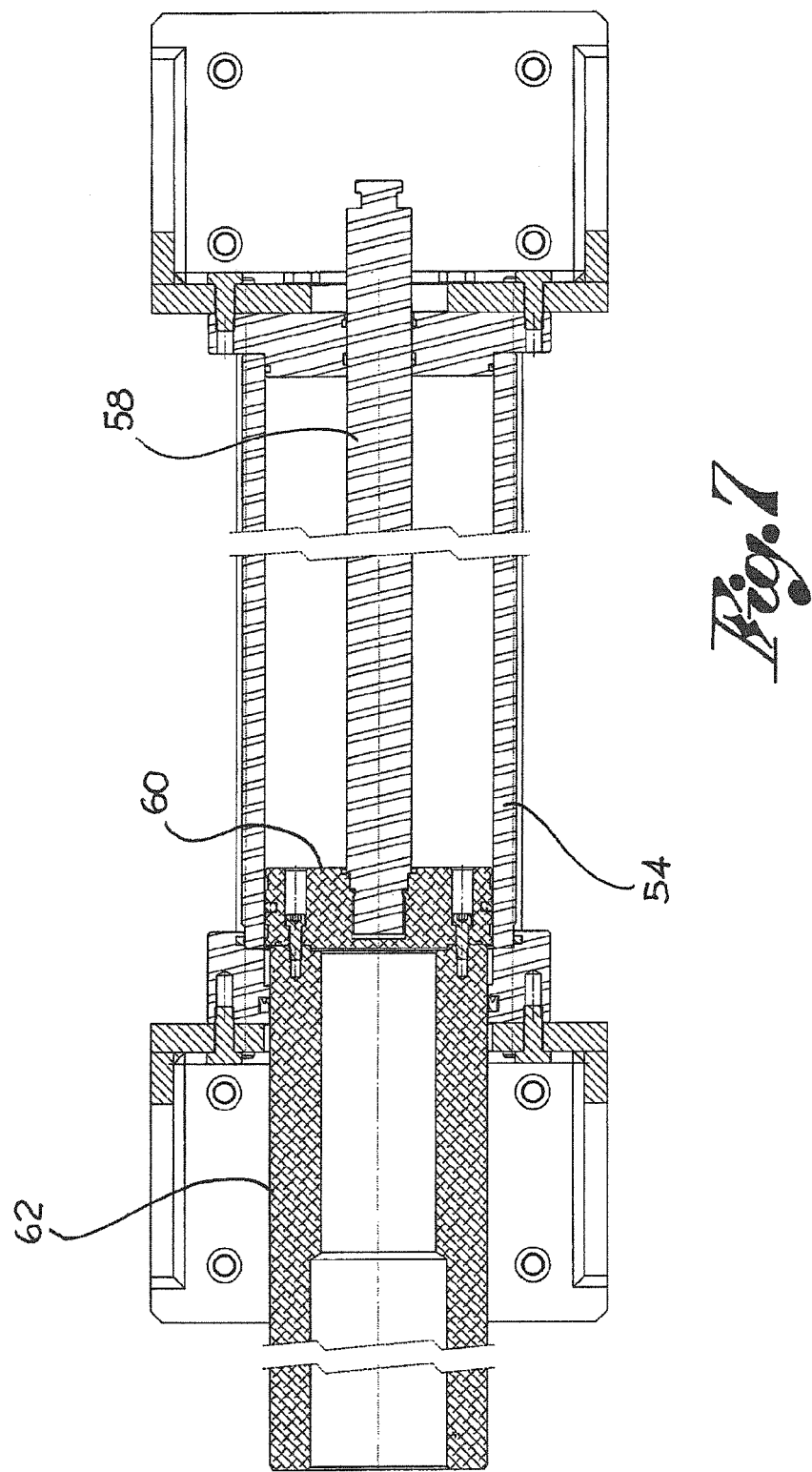
FIG. 7 is an axial section of the cylinder with the piston at end of stroke in the configuration of compression of the working liquid.

In device 50 the motor unit comprises a special hydraulic cylinder in the form of double section thrust cylinder 52, illustrated in greater detail in FIGS. 6-8. Cylinder 52 comprises a sleeve 54, a piston 56 and a rod 58 which, when the cylinder is in the configuration of intake of the working fluid, exits the cylinder sleeve completely. Lever 4 is operatively connected to the free extremity of rod 58 in such a way that the oscillatory motion of lever 4 brings about an axial shifting of rod and therefore of piston 56. With view to obtaining high pressures of the working fluid within cylinder 52, even with waves of limited force, since for reasons of structural toughness a small cylinder could not be employed, a large size two stages cylinder was designed, that is, having a piston 56 in two sections, one of thrust or movement and one of pumping, or force, with a reduced section.

In greater detail, piston 56 has a first thrust section 60 on which lever 4 acts by means of rod 58, the section being substantially equal to that of the cylinder. On the opposite side, i.e. facing from the part opposite to rod 58, the piston has a core 62 which extends substantially for the whole length of cylinder 52 and defines, with the internal surface of sleeve 54, a very narrow annular cavity 64 for containment of the working fluid. In other words, annular cavity 64 is the containment lung of device 50. So, the ring that defines this cavity constitutes the actual force section 66, far smaller than thrust section 60.

Therefore, thrust section 60, due to its greater size, receives only modest pressure from the lever; its sole function is to acquire thrust and transmit it to force section 66 which is the actual pumping section.

The second stage of cylinder 52, containing the working fluid, has a very small pumping section, so when it is subjected to the thrust produced by the first stage it gives the fluid a high pressure, equal to the pressure acting on the first stage of the cylinder multiplied by the ratio between the piston's two thrust sections.

Cavity 64 is in fluidic communication with the connection pipe to hydraulic motor 5 by means of outlet channel 70 and with the pipe from recovery tank 7 by means of fluid inlet channel 72, said channels being created in the cylinder head opposite to the one crossed by rod 58.

Thanks to the special hydraulic cylinder (pressure multiplier) 52 described above, it was found that in simulating a wave with a power of 8 kW, a period of 4 s and a height of 27 cm, the device is capable of delivering electrical power of around 3.5-4 kW, with a yield therefore equal to about 40%.

Machine yield can reach higher values (70-75%) with higher waves (54 cm)

According to one favoured embodiment, the device according to the invention can supply energy not only in the thrust phase of oscillating device 2 but also in the return phase of the said organ by exploiting the action of counterweight 9. To this end, with reference to FIGS. 3-5, lever 4 acts alternatively on two opposite fluid containment lungs, in the examples illustrated advantageously comprising pressure multiplier cylinders 52.

For example, in an advantageous embodiment, oscillating device 4 is operatively connected to the rods 56 of two pressure multipliers 52, opposed in such a way as to act alternatively on the said pressure multipliers. In particular, when the device undergoes the thrust of a wave it acts in compression on the working fluid contained in one cylinder 52 and in intake of fluid into the opposite cylinder; when the device is in return phase, the two cylinders 52 work with one on intake and the opposite on compression.

Preferably each containment lung 3 of the working fluid is associated with its own turbine 5 and its own circuit of turbine supply and fluid recovery.

In order to act in compression on the working fluid also in the return phase of the oscillating device, the action of counterweight 9 on that organ must have a suitable intensity. To this end, with reference to FIG. 3, counterweight 9 is movable along a portion of substantially horizontal extremity 4' of lever 4, opposite the profiled extremity 8 on which the waves act, in such a way as to be positioned as much as possible "overhanging" the lever 4, in order to increase the arm of the lever.

In one embodiment, counterweight 9 is movable in function of wave power. In greater detail, if the waves have a limited power and therefore height, counterweight 9 is shifted from the farthest extremity in such a way as to carry out only the return action. In this case the device generates energy only in the thrust phase, and only one containment lung 3 works in fluid compression.

If however the waves are of appropriate power and height, for example greater than a certain pre-established threshold, counterweight 9 is shifted, for example automatically, towards the farthest extremity of lever 4 until it balances the two thrust and return movements and therefore the two pumping forces. In this case the second pressure multiplier is also activated.

According to one embodiment, shifting of the counterweight is commanded automatically by a control unit, for example when oscillating device 4 comes into contact with end of stroke arrests 20, 21.

Figure 4:
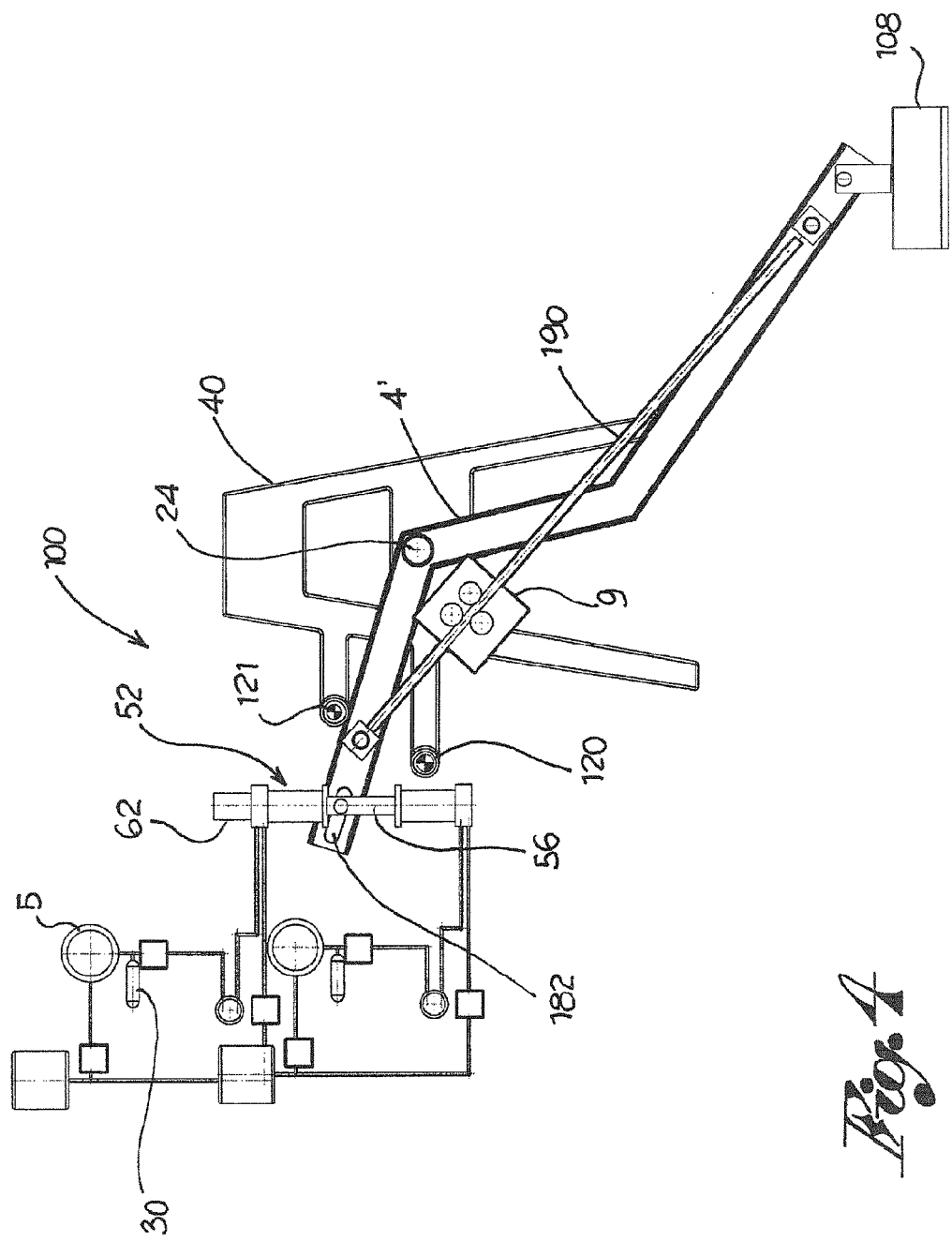
FIG. 4 shows the device in another preferred embodiment, seen from the side.
Figure 5:
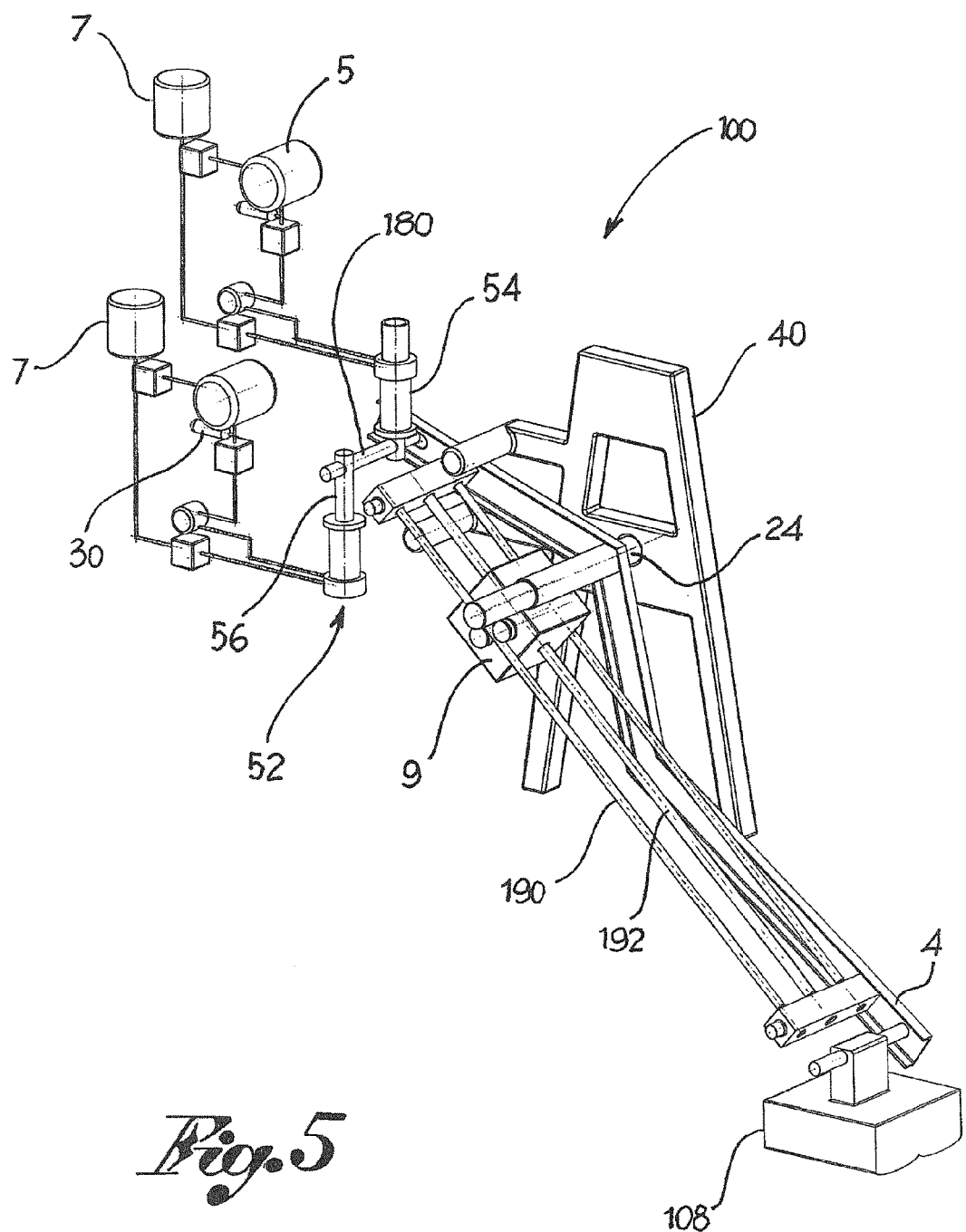
FIG. 5 shows the FIG. 4 device in perspective view.

FIGS. 4 and 5 illustrate a device 100 according to the invention in a embodiment wherein oscillating device 4 has a prevalent horizontal extension, i.e. parallel to the sea. In this figure, the common or equivalent parts with regard to previously described embodiments are indicated with the same numerical references.

In this case, the extremity of oscillating device 4 on which the waves act carries a float 108. Advantageously, float 108 is built with a special form that exploits racing yacht construction technology, giving it considerable floatability even under high weight stresses.

The oscillating device 4 oscillates around pin 24 and its oscillation is limited by lower and upper arrests 120 and 121.

According to one favoured embodiment, the oscillating device 4 is operatively connected to rods 56 of two opposed pressure multiplier cylinders 52, of the type described above, in such a way as to permit pumping of the working fluid in both the wave thrust phase—therefore in the rising phase of float 108—and in the falling phase of the float. In this case the two special cylinders are set vertically. For example, the extremities of the two rods 56 are linked by transversal pin 180 which engages a slot 182 in the extremity of lever 4 opposite the float.

According to one favoured embodiment, a sliding guide 190 for mobile counterweight 9 extends along lever 4. For example, this counterweight runs along guide 190 moved by worm screw 192 activated by a motor apparatus (not shown).

Advantageously, the motor apparatus is commanded by a control unit, for example when the oscillating device 4 comes into contact with end stroke arrests 120, 121.

It should be pointed out that in the absence of counterweight 9, i.e. in the neutral phase, lever 4 is raised in function of wave force, but in the absence of the latter the lever is lowered by the force of its own weight alone. This force would be insufficient for compressing the working fluid in the descent phase. But by increasing lever weight more force could be obtained in this phase. However, the applied weight contrasts the rising phase, reducing wave height and therefore the stroke of the lever.

One aspect of the invention therefore regards adjustment of lever weight in function of various wave conditions, especially different wave strengths and heights. The technical solution adopted envisages positioning counterweight 9 in correspondence to the pin of the lever, i.e. in a non-influencing position in a situation of low wave force. In this case lever 4 pumps only on one cylinder 52, the lower one. On increase of the waves in force and height, for example when contact is detected between the lever and the lower end stroke arrest, the counterweight is automatically commanded to shift towards the water, increasing lever weight, until it balances pumping forces and stroke in the two phases of rising and descent. In this way the upper cylinder is also activated and both movements of the lever are exploited even in the case of very high and powerful waves.

FIGS. 9 and 10 show the device in a further, particularly advantageous embodiment, globally denoted by reference numeral 200, essentially resulting from the vertical oscillating lever device 4 (with the scoop 8) in FIGS. 1-3, with the horizontal oscillating lever device 4' (with the float 108) in FIGS. 4 and 5. In said figures, the elements common to the aforesaid embodiments are indicated by the same reference numerals.

According to a general embodiment of the device 200, the oscillating organ of said device comprises a lever extending essentially horizontally 4' carrying, towards the sea, a float 108', able to receive a vertical thrust from the waves. Behind the float, towards the fulcrum 24 of the horizontal lever 4' is another lever 4", extending essentially vertically, having a lower extremity 8 of a concave shape (like a scoop) able to receive the thrust of the sea waves acting essentially in a horizontal direction, said levers 4' and 4" being positioned so that when the thrust of the wave ceases in a vertical direction on the first lever 4' (with float 108') the thrust of the wave in a horizontal direction commences on the second lever 4" (with scoop 8), and vice versa.

More in detail, the device 200 essentially has the same structure as the device 100 with a horizontal lever 4', with the main difference that to said lever 4', preferably towards the float 108', a lever 4" terminating in a concave extremity 8, for example scoop-shaped, is hinged so as to freely oscillate. Such lever 4" with scoop 8 acts as a vertical oscillating lever able to receive the thrust of the wave acting in a horizontal direction, as described in relation to the devices 1 and 50.

The oscillatory movement of the vertical oscillating lever 4" is transmitted to a motor unit, in the same way as described above.

Advantageously, for example, a hydraulic cylinder 210 is hinged at one extremity to the horizontal lever 4' and at the other to the vertical lever 4", preferably near the scoop 8. This way the oscillation of the vertical lever 4" between an essentially vertical rest position and an end stroke position inclined backwards in relation to the oncoming waves causes the movement of the piston of said hydraulic cylinder 210.

Before describing the functioning of this device 200, it is worth remembering that as sea waves approach the coast they increase in height and decrease in length. The mass of water which they are composed of therefore acquires a considerable and powerful horizontal thrust. The device 200 is designed to fully exploit the energy produced by the waves, especially near the coast, in that by combining the action of the horizontal lever with float with the action of the vertical lever with scoop, it can exploit both movements of the wave, vertical and horizontal, effectively capturing all the available energy and transferring the energy acquired to the motor unit continuously, at constant power. In turn, the motor unit is therefore able to continuously run the electricity generator unit.

Starting from the situation illustrated in FIG. 11(*a*), in which the float 108' has just passed the belly of the wave and the scoop 8 skims the surface of the water, the wave reaches the float 108' and raises it the entire height of the wave, that is until it reaches the crest (FIG. 11(*e*)).

In this phase, the upward movement of the float 108' makes the horizontal lever 4' oscillate which, in turn, activates the pressure multiplier 52. The oil pumped at high pressure by the pressure multiplier runs through the hydraulic circuit and powers the turbine 5 connected to the generator which thus produces electricity.

In this phase of the float 108' rising, the scoop 8 is also raised above the surface of the water and thus is irrelevant.

When the active thrust effect of the wave on the float 108' has ceased, the horizontal lever 4', following the float, descends following the course of the wave (FIGS. 11(*f*)-11(*l*)).

The descent phase of the horizontal lever 4' causes the insertion of the scoop 8 in the wave, keeping it immersed until the float begins to rise again.

Throughout this descent phase of the float 108', the scoop 8, being at least partially immersed in the water, undergoes the thrust of the waves and is able to power the hydraulic cylinder 210, which pumps oil under pressure to the motor unit.

It should be noted that in FIGS. 9-11, the float 108' is a spherical or semi-spherical shape so as not to obstruct the scoop when the two parts are adjacent.

According to one advantageous embodiment, the hydraulic cylinder 210 has the same pumping section and the same stroke as the pressure multiplier and the relative hydraulic circuit is connected to that of the pressure multiplier 52 joined to the horizontal lever 4', so as to share at least the turbine 5 and the collection tank 7. This way, the oil pumped into the circuit by the hydraulic cylinder 210 has the same pressure and flow characteristics as the oil pumped by the pressure multiplier thus keeping the rotation of the generator and electric power produced, constant and continuous.

It is therefore possible, by fully balancing the active phases of the lever with float and the lever with scoop, to constantly and continuatively produce electric power.

It is worth noting that a pressure multiplier does not need to be joined to the vertical lever 4" in that said lever 4" has to sustain much less strain than the horizontal lever 4', so that a traditional cylinder structure is sufficient to withstand the strain it is subjected to.

Surprisingly, the combined device therefore makes it possible to capture practically all the kinetic energy of the waves along the coast transforming it into electricity, the only losses being those associated with the normal reduction in efficiency of any transformation cycle.

It is worth noting that, thanks to the possibility of exploiting the oscillation of the vertical lever 4" during the descent phase of the float 108', in the combined device 200, use of the upper pressure multiplier 52 could be avoided 52. It is possible however that in certain sea conditions, the float, so as to better exploit the power of the waves, may need a load to sink it into the wave itself. By adjusting the position of the mobile counterweight it is possible to apply the necessary load to the float. In this case it would be advantageous to exploit the load applied to the float in the descent phase of the said float too. Consequently in this event, the use of the two pressure multipliers 52 (lower and upper) would be useful.

It is worth noting that the mobile counterweight 9 may also be used by shifting it to the extremity opposite the float and/or scoop, to raise these parts so as to extract them from the waves and prevent the device from getting damaged in the case of fierce storms.

It is also worth noting that, in the case of use of the device in deep waters, for example on oil platforms, the two single implementation systems (vertical lever only or horizontal lever only) are in any case efficient.

In brief, the device for generating electricity from waves according to the invention comprises a lever 4 immersed in the waves, oriented in a substantially horizontal or vertical manner which, due to the effect of the waves, moves like a pendulum, acting as a pumping agent for the movement of the fluid contained in at least one hydraulic cylinder. The fluid, pumped by the oscillating lever, is forced into a hydraulic circuit and, through a pressure multiplier, is conveyed to a hydraulic motor that powers an electricity generator.

In practice, the force of the waves is translated directly into pressure on the working fluid; wave height and frequency act on the delivery of the fluid.

On this question it should be noted that through acting on lever ratio, i.e. on the ratio of the power arm (on which the wave acts) and the resistance arm (on which the fluid pressure multiplier or containment lung acts), the fluid compression force and the extent of lever movement can be varied in such a way as to achieve the correct compromise, for example in function of the environmental conditions in which the device is employed.

The technical solution regarding use of a mobile counterweight further means that the device can be adapted to wave conditions in such a way as to obtain maximum yield in all situations, even with waves as high as twice the stroke of the pressure multiplier.

Innovatively, this invention produces electricity by means of an oscillating device which, set moving by waves, transmits kinetic energy to a motor unit which in turn exploits the said kinetic energy to set in motion an electrical rotating machine hooked up, for example, to an alternator or a dynamo.

Again innovatively, the device uses turbines to produce electricity but avoids their contact with seawater.

Advantageously, the device in this invention allows the use of turbines constructed in materials that are non-resistant or only slightly resistant to marine corrosion, thus reducing costs.

Advantageously the device allows the use of ordinary turbines, in other words not special ones such as are used offshore or in coastal devices, exploiting waves for the compression of air.

Advantageously the device is to be installed on the coast, with simplified installation and maintenance interventions.

Advantageously the device produces energy from renewable sources, thus respecting the environment.

Advantageously the device can supply energy in isolated places.

Advantageously the device is of limited bulk so it can be used aboard vessels, on offshore rigs and anywhere else offering the possibility of exploiting wave energy.

Clearly, a skilled person, in order to meet contingent and specific needs, could make modifications to the device described above, yet without going beyond the scope of protection as defined in the following claims.

The invention claimed is:

1. Device for generating electricity (1) from wave energy, comprising:
   an oscillating device (2), able to transform the thrust of a wave on a first extremity of the oscillating device (2) into kinetic energy;
   a motor unit, operatively connected to a second extremity of the oscillating device so as to receive the kinetic energy transmitted to it by the oscillating device (2);
   an electrical rotating machine operatively connected to the motor unit and able to produce electric energy when made to rotate by said motor unit, wherein said oscillating device comprises a first thrust lever (4; 4") with an essentially vertical extension and having a lower extremity (8) of a concave shape able to receive a thrust from the sea waves acting essentially in a horizontal direction, and a second thrust lever (4') with an essentially horizontal extension and carrying a float (108; 108') at one extremity,
   wherein said first thrust lever (4") is hinged to the second thrust lever (4") so as to freely oscillate and is positioned close and behind the float with respect the wave direction such that, when the float reaches the crest of the wave, the lower extremity of the first thrust lever (4') is raised above the surface of the water.

2. Device according to claim 1, wherein the oscillating device (2) comprises in addition a return element (9) able to bring the oscillating device back to the start stroke position.

3. Device according to claim 2, wherein the return element (9) is a counterweight.

4. Device according to claim 3, wherein a sliding guide (190) extends along the said second thrust lever, a mobile counterweight (9) being fixed in a sliding manner to said sliding guide.

5. Device according to claim 4, comprising a control unit configured for automatically moving the counterweight in function of the force acting on the oscillating device (2).

6. Device according to any of claim 1, wherein the motor unit comprises:
- a containment lung (3), able to contain a fluid, said lung being compressible by the oscillating device so as to generate a flow of fluid;
- a turbine (5), set in motion by the fluid coming from the containment lung (3); and
- a recovery tank (7), able to recover the fluid going through the turbine (5) and to re-inject it into the lung (3).

7. Device according to claim 1, wherein the oscillating device (2) comprises a compression means (6) joined to the second extremity of the oscillating device (2).

8. Device according to claim 6, wherein the containment lung has a first end having a wider cross-section and a second end having an outlet to act as a pressure multiplier.

9. Device according to claim 8, wherein the containment lung is a bellows cylinder.

10. Device according to claim 8, wherein the containment lung is a hydraulic cylinder.

11. Device according to claim 8, wherein the containment lung is a pressure multiplier cylinder (52) with at least two stages, a first stage on which the oscillating device acts, having a greater section, and a second stage containing the working fluid, having a lesser section.

12. Device according to claim 11, wherein the pressure multiplier cylinder (52) has a piston (56) with a rod (58) operatively connected to the oscillating device (2), wherein said piston has a thrust section (60), on which the oscillating device (2) acts, having a section substantially equal to the section of the cylinder, and, on the side facing from the part opposite the rod, a core (62) which extends for substantially all the length of the cylinder (52) and defines with the cylinder sleeve (54) an annular cavity (64) which houses the working fluid.

13. Device according to claim 6, wherein the return element is a counterweight, and further comprising two containment lungs or fluid pressure multipliers (3; 52), set opposite and operatively connected with oscillating device (2) in such a way that one containment lung is activated in compression in one phase of thrust of the external agent on the oscillating device and the other containment lung is activated in compression in a return phase of the oscillating device by means of the counterweight (9).

14. Device according to claim 13, wherein the counterweight (9) is movable with regard to oscillation pin (24) of oscillating device (2), into such a position as to exert on the oscillating device a return force sufficient to compress the working fluid in a containment lung (3; 52).

15. Device according to claim 13, wherein a hydraulic cylinder (210) is hinged at one extremity to the second lever (4') and at the other extremity to the first lever (4"), so that the oscillation of the vertical lever (4") between an essentially vertical rest position and an end stroke position inclined backwards in relation to the oncoming waves causes the alternate movement of the piston of said hydraulic cylinder (210).

16. Device according to claim 15, wherein the containment lung joined to the second lever (4') and the hydraulic cylinder joined to the first lever (4") power a common turbine (5) with pressurized fluid and are configured to alternately emit fluid into the hydraulic circuit at the same pressure so as to maintain the rotation of the turbine, and thereby the electricity produced, steady and continuous.

17. Device according to claim 6, wherein the motor unit comprises an expansion vessel (30), situated between the outlet (14) of the containment lung (3) and the turbine (5) so as to power the turbine (5) with fluid under pressure during a return stroke of the oscillating device (2).

18. Device according to claim 1, wherein the electrical rotating machine is a dynamo or an alternator.

19. Method of transformation of the energy produced by the thrust force of a wave into electricity, comprising steps of:
- capturing the thrust of the wave by means of an oscillating device;
- converting the oscillation movement of the oscillating device into rotating movement by means of a pressure multiplier; transmitting said movement to the rotor of an electrical rotating machine,
- wherein the phase of capturing the thrust of the wave comprises a first phase of capturing the thrust of the wave acting in a horizontal direction by means of a first thrust lever with an essentially vertical extension and having a lower extremity suitable for immersing at least partially in the water at least in said first phase to receive said horizontal thrust, and a second phase of capturing the thrust of the wave acting in a vertical direction by means of a second thrust lever with an essentially horizontal extension and a float at one extremity,
- wherein said first thrust lever is vertically moved by the oscillation of the second thrust lever between a lower position, in which the lower extremity is at least partially immersed in the water, and a raised position, in which said lower extremity is above the surface of the water.

20. Method according to claim 19, wherein the oscillating device acts as a pumping organ on at least one hydraulic cylinder containing a working fluid, in such a way that the said fluid is forced into a hydraulic circuit that powers a hydraulic motor, activating an electricity generator.

21. Method according to claim 19, wherein the oscillating device acts as a pumping organ on two opposite hydraulic cylinders, a first of said cylinders being activated in compression by the oscillating device during the thrust of a wave and a second of said cylinders being activated in compression by the oscillating device during its return to a start stroke position by means of a return element.

* * * * *